United States Patent
Woods et al.

(10) Patent No.: US 10,572,188 B2
(45) Date of Patent: Feb. 25, 2020

(54) SERVER-EMBEDDED DISTRIBUTED STORAGE SYSTEM

(75) Inventors: Harold Woods, Colorado Springs, CO (US); Mark Robert Watkins, Bristol (GB)

(73) Assignee: Hewlett Packard Enterprise Development LP, Houston, TX (US)

(*) Notice: Subject to any disclaimer, the term of this patent is extended or adjusted under 35 U.S.C. 154(b) by 961 days.

(21) Appl. No.: 12/243,022

(22) Filed: Oct. 1, 2008

(65) Prior Publication Data
US 2010/0082793 A1    Apr. 1, 2010

Related U.S. Application Data

(60) Provisional application No. 61/020,712, filed on Jan. 12, 2008.

(51) Int. Cl.
| | | |
|---|---|---|
| *G06F 3/06* | (2006.01) | |
| *G06F 11/20* | (2006.01) | |
| *H04L 29/08* | (2006.01) | |

(52) U.S. Cl.
CPC ............ *G06F 3/0664* (2013.01); *G06F 3/067* (2013.01); *G06F 3/0617* (2013.01); *G06F 3/0635* (2013.01); *G06F 11/201* (2013.01); *G06F 11/2089* (2013.01); *G06F 11/2094* (2013.01); *H04L 67/1097* (2013.01)

(58) Field of Classification Search
CPC ...... G06F 3/0617; G06F 3/0664; G06F 3/067; G06F 11/201; G06F 11/2089; H04L 67/1097
See application file for complete search history.

(56) References Cited

U.S. PATENT DOCUMENTS

| | | |
|---|---|---|
| 3,984,817 A | 10/1976 | Barbour et al. |
| 5,504,861 A | 4/1996 | Crockett et al. |
| 5,682,513 A | 10/1997 | Candelaria et al. |
| 5,745,693 A | 4/1998 | Knight et al. |
| 5,754,855 A | 5/1998 | Miller et al. |
| 5,870,537 A | 2/1999 | Kern et al. |
| 6,035,412 A | 3/2000 | Tamer et al. |
| 6,038,379 A * | 3/2000 | Fletcher .............. G06F 11/1456 707/999.01 |

(Continued)

OTHER PUBLICATIONS

Svend Frølund et al., "FAB: Enterprise Storage Systems on a Shoestring", May 2003, Published at the Nineth Workshop on Hot Topics in Operating Systems (HetOS IX), Hawaii, 6 Pages.*

(Continued)

*Primary Examiner* — Aaron N Strange
(74) *Attorney, Agent, or Firm* — Hewlett Packard Enterprise Patent Department

(57) ABSTRACT

A server-embedded distributed storage system and methods are disclosed. An exemplary method may include presenting at least one virtual disk to a client computing device. The at least one virtual disk includes storage cells from direct attached storage (DAS) devices of a plurality of separate servers for high availability access to data stored on the at least one virtual disk. The method may also include continuing to provide access to the data stored on the at least one virtual disk even in the event an internal storage controller for at least one of the plurality of servers is unavailable for managing its DAS device.

18 Claims, 5 Drawing Sheets

(56) References Cited

U.S. PATENT DOCUMENTS

| | | | |
|---|---|---|---|
| 6,148,338 | A | 11/2000 | Lachelt et al. |
| 6,304,980 | B1* | 10/2001 | Beardsley et al. ............... 714/6 |
| 6,662,281 | B2 | 12/2003 | Ballard et al. |
| 6,715,100 | B1* | 3/2004 | Hwang ............................ 714/5 |
| 6,728,751 | B1* | 4/2004 | Cato et al. ..................... 709/202 |
| 6,745,303 | B2 | 6/2004 | Watanabe |
| 6,757,695 | B1* | 6/2004 | Noveck et al. |
| 6,845,465 | B2* | 1/2005 | Hashemi .......................... 714/6 |
| 6,846,465 | B2 | 1/2005 | Commereuc et al. |
| 6,874,103 | B2* | 3/2005 | Cepulis .......................... 714/13 |
| 6,883,065 | B1* | 4/2005 | Pittelkow et al. ............ 711/114 |
| 6,886,032 | B2* | 4/2005 | Watkins et al. ............... 709/216 |
| 6,915,315 | B2 | 7/2005 | Autrey et al. |
| 6,920,579 | B1 | 7/2005 | Cramer et al. |
| 6,952,737 | B1* | 10/2005 | Coates et al. ................. 709/229 |
| 6,961,870 | B2 | 11/2005 | Chiu et al. |
| 7,003,645 | B2 | 2/2006 | Knop et al. |
| 7,085,835 | B2* | 8/2006 | Bantz et al. ................... 709/226 |
| 7,117,390 | B1 | 10/2006 | Klarer |
| 7,133,984 | B1 | 11/2006 | Dickensheets |
| 7,249,220 | B2 | 7/2007 | Fujimoto et al. |
| 7,260,737 | B1 | 8/2007 | Lent et al. |
| 7,296,068 | B1* | 11/2007 | Sarma et al. .................. 709/223 |
| 7,502,955 | B2* | 3/2009 | Ishikawa et al. ................ 714/6 |
| 2002/0116661 | A1 | 8/2002 | Thomas et al. |
| 2004/0250029 | A1 | 12/2004 | Ji et al. |
| 2004/0250031 | A1 | 12/2004 | Ji et al. |
| 2005/0289386 | A1 | 12/2005 | Tawil et al. |
| 2006/0010351 | A1* | 1/2006 | Lee ..................... G06F 11/0727 714/43 |
| 2006/0143498 | A1 | 6/2006 | Hatasaki et al. |
| 2006/0143502 | A1 | 6/2006 | Chawla et al. |
| 2006/0206671 | A1 | 9/2006 | Aiello et al. |

OTHER PUBLICATIONS

Chen et al., RAID: High-Performance, Reliable Secondary Storage, 1994, 26 ACM Computing Surveys 145, 154-155.*

Chandy, K. Mani, Lamport, Leslie, "Distributed Snapshots: Determining Global States of a Distributed System" ACM Transactions on Computer Systems 3, (Feb. 1, 1985), 63-75.

Ji, Minwen, Veitch, Alistair, Wilkes, John, "Seneca: remote mirroring done write," Proceedings of USENIX Technical Conference, Berkeley, CA, Jun. 2003, 253-268.

Frolund, "FAB: enterprise storage systems on a shoestring," Published at the Nineth Workshop on Hot Topics in Operating Systems (HotOS IX), Hawaii, May 2003.

John Wilkes, "Datamesh research project, phase 1", In Proc. USENIX Workshop on File Systems, May 1992, 7 pages.

E.K. Lee, et al., "Petal: Distributed Virtual Disks", In The Proceedings of the 7th International Conference on Architectural Support for Programming Languages and Operating Systems, 1996, 9 pages.

IBM, "IceCube—Storage Server for the Internet Age", Feb. 15, 2007, 2 pages. <https://web.archive.org/web/20020215010058/http://www.almaden.ibm.com/cs/storagesystems/IceCube/>.

* cited by examiner

SERVER-EMBEDDED DISTRIBUTED STORAGE SYSTEM

CROSS REFERENCE TO RELATED APPLICATIONS

This Application claims the benefit of U.S. Provisional Application Ser. No. 61/020,712, filed Jan. 12, 2008, titled "Server-Embedded Distributed Storage System" which is hereby incorporated by reference herein as if reproduced in full below.

BACKGROUND

Storage Area Networks (SANs) are commonplace in network environments. The SAN includes a plurality of storage cells which may be logically grouped so as to appear as direct attached storage (DAS) units to client computing devices. However, SANs offer many advantages over DAS units. For example, SANs eliminate a single point of failure which may occur with DAS units. In addition, SANs can be readily scaled by adding or removing storage cells to suit the needs of a particular network environment.

The storage cells in a SAN are managed by dedicated external storage controllers. The storage controllers are interconnected with one another to allow data to be stored on different physical storage cells while appearing the same as a DAS unit to client computing devices. This configuration also enables data redundancy (also referred to as mirroring or back-up) for data recovery operations. Although entire storage cells may be copied onto secondary or redundant storage cells periodically as a means of backing up the data, more sophisticated data redundancy operations may also be enabled wherein only changes to the data are recorded to other storage cells.

Conventional distributed storage arrays, however, are hardware intensive. That is, in addition to having all of the components required for a typical computer network (i.e., client computing devices, servers, network routers, etc.), a network environment implementing a distributed storage array also requires a complex storage network with dedicated storage controllers and separate storage cells. Accordingly, these distributed storage arrays require a greater physical "footprint" which can be problematic where space is at a premium. The additional hardware required for the distributed storage array also increases the cost to implement and maintain the network environment, typically requiring trained technicians to diagnose and correct problems in the storage network.

DETAILED DESCRIPTION

A server-embedded distributed storage system and methods are disclosed. In an exemplary embodiment, the server-embedded distributed storage system comprises a plurality of interconnected servers. Internal storage controllers are provided within the servers and interconnected to one another to provide what functions similar to a conventional networked storage array, including the advantages of data redundancy and having no single point of failure.

Briefly, the server-embedded distributed storage system reduces costs associated with deploying and maintaining a network environment by eliminating the need for external storage controllers and related storage area network (SAN) hardware. Instead, the server-embedded distributed storage system uses or reuses hardware that may already be present in the servers, such as, direct attached storage (DAS) devices, storage controllers for the DAS devices, connections (Serial Attached SCSI (SAS), where SCSI is the Small Computer System Interface), Ethernet, etc.), power supplies, cooling infrastructure, etc.

The server-embedded distributed storage system also provides storage in a manner consistent with applications that demand high availability storage, by having access to a common pool of storage via a plurality of servers, without the need for a SAN. Even applications that do not demand high availability can benefit from the high availability storage while executing in an active/standby fashion. These and other advantages will be readily apparent to those having ordinary skill in the art after becoming familiar with the teachings herein.

Exemplary System

Figure 1:
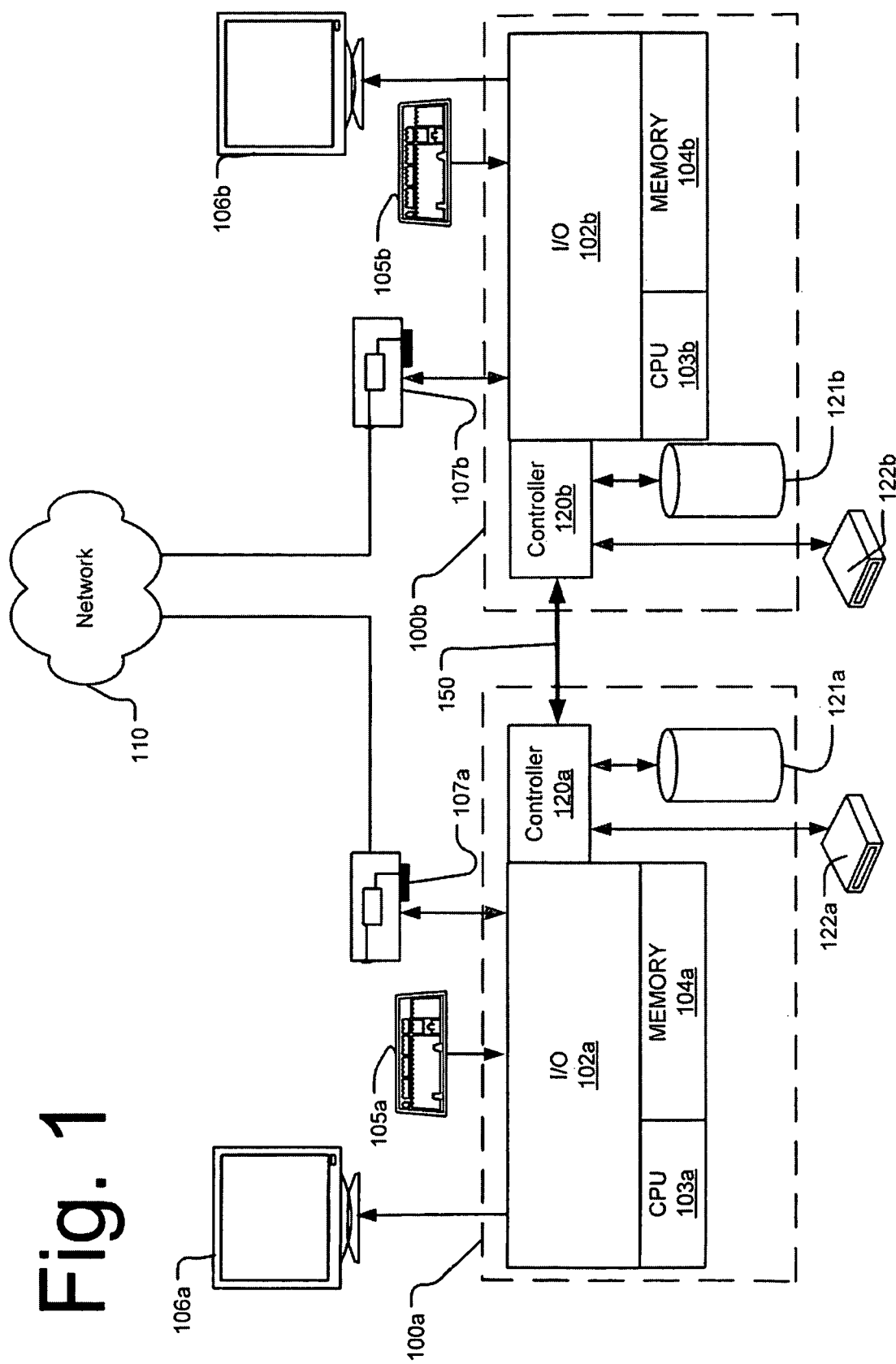
FIG. 1 is a block diagram showing exemplary servers which may be implemented in a server-embedded distributed storage system.
Figure 2:
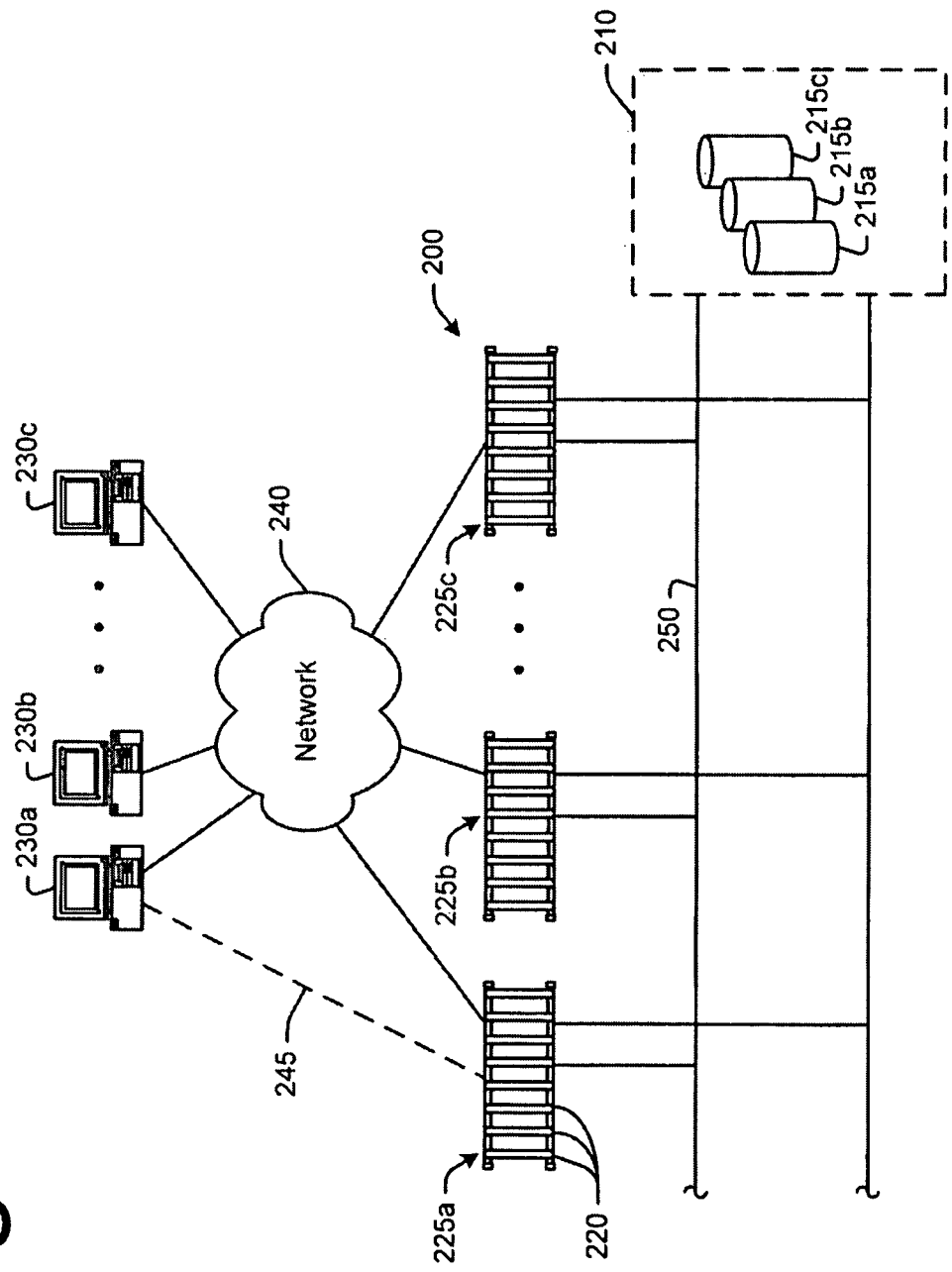
FIG. 2 is a high-level diagram showing an exemplary server-embedded distributed storage system.

FIG. 1 is a block diagram showing exemplary servers 100a-b which may be implemented in a server-embedded distributed storage system (e.g., system 200 shown in FIG. 2). Some of the elements of an exemplary server 100a-b are shown in FIG. 1, including a motherboard 101a-b having an input/output (I/O) controller 102a-b, at least one processing unit 103a-b (e.g., a microprocessor or microcontroller), and memory 104a-b. The memory 104 may also be referred to as simply memory, and may include without limitation read only memory (ROM) and random access memory (RAM) and/or other dedicated memory (e.g., for firmware).

A basic input/output system (BIOS), containing the basic routines that help to transfer information between elements within the server 100a-b, such as during start-up, may be stored in memory 104a-b. Computer program code (e.g., software modules and/or firmware) containing mechanisms to effectuate the systems and methods described herein may reside in the memory 102a-b or other memory (e.g., a dedicated memory subsystem).

The I/O controller 102a-b is optionally connected to various I/O devices, such as, keyboard 105a-b, display unit 106a-b, and network controller 107a-b for operating in a network environment 110. I/O devices may be connected to the I/O controller 102a-b by means of a system or peripheral bus (not shown). The system bus may be any of several types of bus structures including a memory bus or memory controller, a peripheral bus, and a local bus using any of a variety of bus architectures.

A storage controller 120a-b may also be provided in each of the servers. 200a-b. In an exemplary embodiment, the storage controller 120a-b is a modified RAID-on-Chip (ROC) storage controller. However, other types of storage controllers now known or later developed may be modified to implement the systems and methods described herein.

The storage controller 120a-b may be connected to one or more storage device, such as internal DAS device 121a-b and external DAS device 122a-b. The DAS devices provide nonvolatile storage of computer-readable instructions, data structures, program modules and other data. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

In the server-embedded distributed storage system, a plurality of servers may be bound together. In this embodiment, two servers 100a-b are bound together via a suitable interconnect such as via network 110 or other interconnect 150 so that the storage controllers 120a-b can communicate with one another.

In an exemplary embodiment, the servers are c-class blade-type servers and the interconnect is implemented using SAS ports on the controller hardware of each server. Alternatively, rack mount servers may be implemented and the interconnect can again be implanted made using the SAS ports to provide access to a common pool of SAS or SATA drives as well as the inter-controller link interconnect. Other interconnects, such as Ethernet or fibre channel (FC), may also be used to bind the servers so that the storage controllers 120a-b can access volumes on the DAS devices just as they would using conventional external array controllers.

Utilizing existing disk interconnects to enable both array software images to have access to a common pool of disks provides a communications link for necessary operations to enable high availability storage. This configuration also enables other servers to gain access to the storage provided on other servers. The infrastructure is provided at very low-cost and offers the additional benefit of utilizing shared rack space, power and cooling and other system components on the same server which executes applications in the network environment.

The separate hardware infrastructure for the storage controllers provides isolation such that the hardware and program code can be maintained separately from the remainder of the server environment. This configuration allows the maintenance, versioning, security and other policies, which tend to be very rigorous and standardized within corporate IT environments for servers, to be performed without affecting or impacting the storage system. At the same time the storage controllers can be updated and scaled as needed.

It is noted, however, that by utilizing the servers 100a-b internal storage controllers 120a-b in a distributed environment, the storage controllers 120a-b function within the constraints of the server. Accordingly, the firmware for the storage controllers 120a-b enable the negotiations for shared resources, such as memory, interconnects, and processing power. In addition, the firmware enables shared responsibility for managing faults within the server, and notification of faults to the server management software.

FIG. 2 is a high-level diagram showing an exemplary server-embedded distributed storage system 200 with optional remote storage 210. The server-embedded distributed storage system 200 may include a plurality of storage cells (illustrated by storage cells 220). In an exemplary embodiment, the storage cells 220 are the DAS devices (either internal, external, or both) in one or more servers, as described above with reference to FIG. 1.

In FIG. 2, the storage cells 220 are shown as they may be logically grouped into one or more virtual disks 225a-c, i.e., as the storage may be "seen" and accessed by one or more client computing device 230a-c (also referred to as "clients"). In an exemplary embodiment, the clients 230a-c may be connected to server-embedded distributed storage system 200 via a communications network 140 and/or direct connection (illustrated by dashed line 245) to the servers. The communications network 240 may include one or more conventional local area network (LAN) and/or wide area network (WAN).

Before continuing, it is noted that the term "distributed storage" is used herein to mean multiple storage "cells". Each cell, or group of cells resides in a fully functional server (e.g., the server has a processor, memory, network interfaces, and disk storage). Internal storage controllers manage the cells by coordinating actions and providing the functionality of traditional disk-based storage to clients by presenting virtual disks to clients via a unified management interface. The data for the virtual disks is itself distributed amongst the cells of the array. That is, the data stored on a single virtual disk may actually be stored partially on the DAS devices of multiple servers, thereby eliminating the single point of failure.

It is also the case that a pool of storage controllers may be provided such that in the event of a failure of the storage controller, either a "spare" controller may be utilized from the pool to restore high availability or the disks owned by the storage controller may be distributed to other controllers. This concept accommodates independent scaling and failure management of the server, embedded storage controller, DAS devices and interconnect.

Redundancy and data recovery schemes may also be utilized to safeguard against the failure of any one cell. Clients are able to make a connection to any cell, and utilize the full data capacity of the distributed array. I/O requests (reads and writes) from the clients to the virtual disk are satisfied by relevant storage controllers for the respective cells, which coordinate their data and operational states of the DAS devices and determine the correct response.

It is noted that the terms "client computing device" and "client" as used herein refer to a computing device through which one or more users may access the server-embedded distributed storage system 200. The computing devices may include any of a wide variety of computing systems, such as stand-alone personal desktop or laptop computers (PC), workstations, personal digital assistants (PDAs), or appliances, to name only a few examples. Each of the computing devices may include memory, storage, and a degree of data processing capability at least sufficient to manage a connection to the servers in the server-embedded distributed storage system 200, e.g., via network 240 and/or direct connection 245.

A form of client is also the application running on the server which the server-embedded storage system is supporting. This may be implemented as one or more applications or as one or more virtual machines each running one or more application. The virtual machine case is particularly interesting. As a virtual machine moves from one server to another the storage can move with it without requiring a SAN, something that DAS alone cannot do without copying all of the data.

Optionally, the server-embedded distributed storage system 200 may be communicatively coupled to remote storage 210 e.g., via a back-end network 250 or direct connection (not shown). Remote storage 210 may include one or more storage devices 215a-c for mirroring data stored on one or more of the storage cells 220 in distributed storage array 100. In an exemplary embodiment, remote storage 210 may be physically located in close proximity to the distributed storage array 200. In another exemplary embodiment, at least a portion of the remote storage 210 may be "off-site" or physically remote from the distributed storage array 200, e.g., to provide a further degree of data protection.

Exemplary embodiments may include a pool of embedded controllers and a pool of disk drives that are divided up among the controllers. Pairs of controllers are bound together to deliver a high availability system but these pairings can be dynamically managed. For example if a server or blade is running a virtual machine and the virtual machine is moved from one server to another, responsibility for managing the disks associated with the data for the application can be moved to the embedded controller in the server where the virtual machine is now hosted without having to copy data. This is not possible in DAS.

Exemplary embodiments may also enable load balancing for increasing performance. If a controller is serving data to a server across a network (SAS or Ethernet), the controllers may move responsibility for the disks containing the data to another controller (pair) that is less taxed.

Yet another exemplary embodiment may enable enhanced redundancy in the event of either a server or embedded controller failure where the failure results in a loss of normal redundancy. In this case the responsibility for managing the disks may be moved to another controller (pair) or the failed server/embedded controller may be replaced from the pool of controllers and redundancy re-established quickly (seconds/minutes) as opposed to requiring a service call to replace a failed controller in the external controller (SAN) case which may take hours or even days.

It is readily apparent that the server-embedded distributed storage system 200 configured as described above is a form of storage virtualization in that it provides an abstraction between the application operating environment using the standard interfaces to DAS devices, but provides a more capable and robust storage system in the form of availability, sharing and other functions associated with shared external storage. For example, the server-embedded distributed storage system 200 may provide cache mirroring, active/active pathing, and state communication so that in the event of a failure of one controller the other controller can assume responsibility for I/O as would occur in a high availability external array controller, as explained in more detail with reference to the illustrations in FIGS. 3 and 4.

Figure 3:
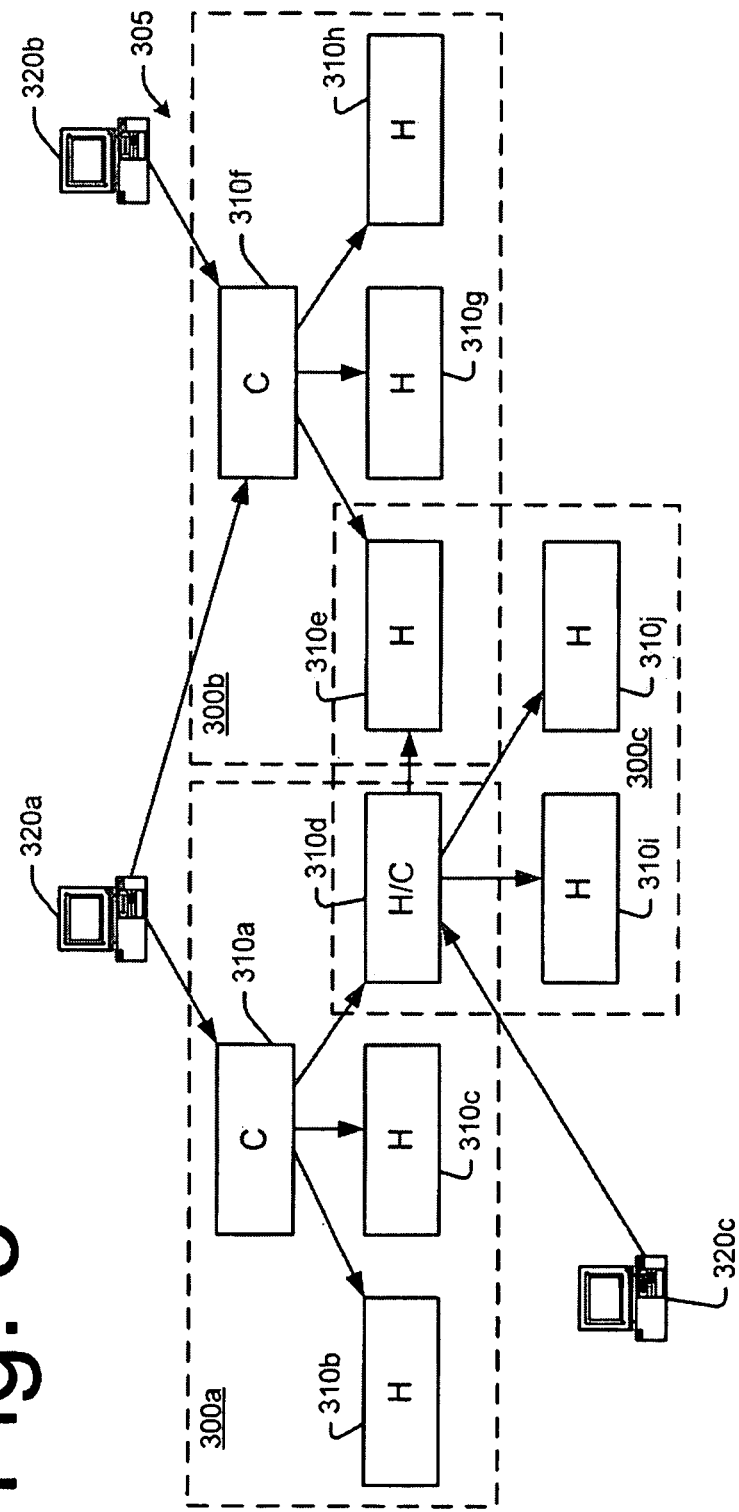
FIG. 3 is an illustrative diagram showing exemplary virtual disks in the server-embedded distributed storage system.

FIG. 3 is a diagram showing exemplary virtual disks 300a-c which may be presented to a client in a server-embedded distributed storage system 305. For example, the virtual disks 300a-c may correspond to the virtual disks 225a-c shown in FIG. 2. Each virtual disk 300a-c may include a logical grouping of storage cells selected from the DAS devices in a plurality of servers (e.g., as shown in FIG. 2). For purposes of illustration, virtual disk 300a is shown including storage cells 310a-d, virtual disk 300b is shown including storage cells 310e-h, and virtual disk 300c is shown including storage cells 310d-e and 310i-j. Although the storage cells 310a-d may reside at different servers within the server-embedded distributed storage system 305, each virtual disk 300a-c appears to the client(s) 320a-c as an individual storage device or "disk".

When one of the client 320a-c accesses a virtual disk 300a-c for a read/write operation, the storage controller for one of storage cells 310 in the virtual disk 300a-c is assigned as a coordinator (C). The coordinator (C) coordinates transactions between the client 320 and data handlers (H) for the virtual disk. For example, storage cell 310a is assigned as the coordinator (C) for virtual disk 300a, storage cell 310f is assigned as the coordinated (C) for virtual disk 300b, and storage cell 310d is assigned as the coordinator (C) for virtual disk 300c.

It is noted that the coordinator (C) is the storage controller that the client sent the request to, but the storage cells 310 do not need to be dedicated as either coordinators (C) and/or data handlers (H). A single virtual disk may have many coordinators simultaneously, depending on which cells receive the write requests. In other words, coordinators are assigned per write to a virtual disk, rather than per virtual disk. In an exemplary embodiment, a storage cell 310 may be a data handler (H) for a virtual disk while also serving as a coordinator (C) for another virtual disk. In FIG. 3, for example, storage cell 310d is a data handler (H) for virtual disk 300a while also serving as a coordinator (C) for virtual disk 300c. It is also noted that a storage cell 310 may serve as a data handler (H) for more than one virtual disk. In FIG. 3, for example, storage cell 310c is a data handler (H) for both virtual disk 300b and virtual disk 300c.

Figure 4:
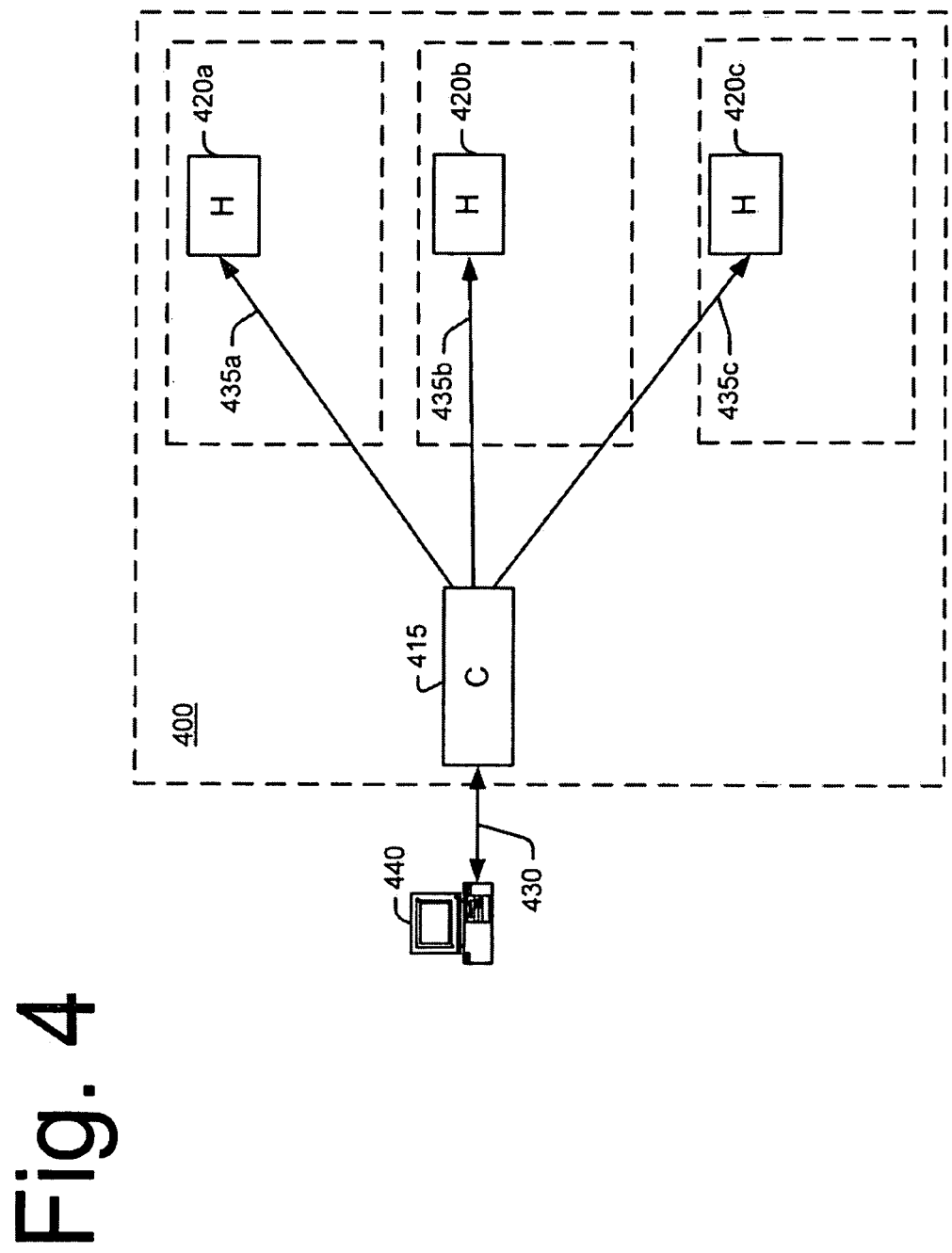
FIG. 4 is an illustrative diagram of a virtual disk showing write operations to individual storage cells of the virtual disk.

FIG. 4 is a high-level diagram of a virtual disk 400 illustrating write operations to individual storage cells 420a-c of the virtual disk 400. As mentioned above, one of the storage controllers is assigned as the coordinator (C) during a read/write operation (e.g., storage cell 415 is assigned as the coordinator (C) in FIG. 4). All transactions (illustrated by arrows 430) between a client 440 and the virtual disk 400 are via the coordinator (C). The coordinator (C) retrieves data from the data handlers (H) 420a-c during read operations, and records data to the data handlers (H) 420a-c during write operations (also referred to as a "write" or "writes" and illustrated by arrows 435a-c).

Read operations may be handled in a similar manner to that described for the write operations. Optionally, a redundant copy of the data stored in virtual disks may also be maintained on a remote storage for data redundancy operations. It is noted that the remote storage is not shown in FIG. 3 or 4 for purposes of simplifying the drawings, but the remote storage may be implemented in the server-embedded distributed storage system as described above for the remote storage 210 shown in FIG. 2.

It is noted that the exemplary embodiments of the server-embedded distributed storage system discussed above are provided for purposes of illustration and are not intended to be limiting.

Exemplary Operations

Figure 5:
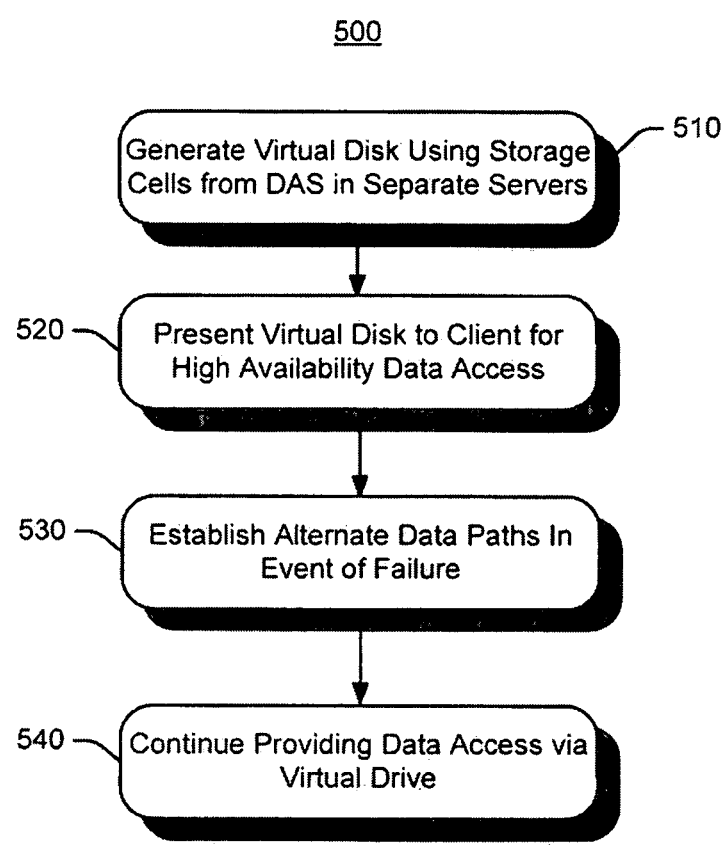
FIG. 5 is a flowchart of exemplary operations which may be implemented by a server-embedded distributed storage system.

FIG. 5 is a flowchart of exemplary operations which may be implemented by a server-embedded distributed storage system. Operations 500 may be embodied as logic instructions on one or more computer-readable medium. When executed on a processor, the logic instructions cause a general purpose computing device to be programmed as a special-purpose machine that implements the described operations. In an exemplary embodiment, the components and connections depicted in the figures may be used.

In operation 510, a virtual disk may be generated using one or more storage cells from direct attached storage (DAS) devices of a plurality of separate servers. In operation 520, the virtual disk is presented to a client computing device. The virtual disk provides high availability access to data by the client computing device, e.g., by functioning as a coordinator (C) and handler (H) as described above with reference to FIGS. 3 and 4. The virtual disk may also provide failover access to data by the client computing device. In an exemplary embodiment, the virtual disk may implement RAID 0, 1, 5, 6, 10, 50, and 60 data redundancy. For example, in operation 530, one or more functioning storage controller may establish alternate data paths in the event of a failure, e.g., by assigning a different coordinator (C) and/or handler (H). Accordingly, in operation 540, access to the data stored on the virtual disk continues to be provided to client(s) via the virtual drive. That is, the virtual drive is fully functional even if an internal storage controller for at least one of the plurality of servers fails or is otherwise unavailable for managing its DAS device and/or one or more DAS device fails or is otherwise unavailable.

The operations shown and described herein are provided to illustrate exemplary embodiments which may be implemented by a server-embedded distributed storage system. The operations are not limited to the operations shown or to the ordering of the operations shown. Still other operations and other orderings of operations may be implemented to enable a server-embedded distributed storage system.

It is noted that the exemplary embodiments shown and described are provided for purposes of illustration and are not intended to be limiting. Still other embodiments are also contemplated.

The invention claimed is:

1. A server-embedded distributed storage system comprising:
a plurality of servers each having a direct attached storage (DAS) device and an internal storage controller to manage the DAS device, wherein the internal storage controllers in separate servers are interconnected to one another via a storage device interconnect to be a pool of controllers,
a virtual disk including a plurality of storage cells selected from the DAS devices of the plurality of servers, the virtual disk managed by the internal storage controllers in the pool of controllers to provide access to data stored on the storage cells of the virtual disk,
wherein the internal storage controllers in the pool of controllers are assigned to be data handlers for controlling specific storage cells of the virtual disk, and
wherein one of the internal storage controllers in the pool of controllers is selected to be a coordinator of the virtual disk to coordinate transactions between a client computing device and the data handlers of the virtual disk.

2. The system of claim 1, wherein, in response to a failure of one of the internal storage controllers, another internal storage controller in the pool of controllers is assigned to be a data handler for the failed internal storage controller.

3. The system of claim 1, wherein, in response to a failure of the selected internal storage controller, another internal storage controller in the pool of controllers is selected to be the coordinator to coordinate the transactions between the client device and the data handlers of the virtual disk.

4. The system of claim 1, wherein the internal storage controllers each manage a single cache for data redundancy.

5. The system of claim 1, wherein at least one of the internal storage controllers access remote storage for data recovery operations.

6. The system of claim 1, wherein the internal storage controllers each negotiate for shared resources in their respective server.

7. The system of claim 1, wherein the internal storage controllers execute dedicated program code so that the internal storage controllers function independently of software executing on the server.

8. The system of claim 1, wherein the storage device interconnect comprises a Serial Attached Small Computer System Interface (SAS) interconnect.

9. The system of claim 1, wherein the internal storage controllers are to negotiate for at least one of memory, interconnects and a processing power shared by the internal storage controllers.

10. A method of providing server embedded distributed storage, the method stored as instructions on a non-transient computer readable media and executed by a processor, the method comprising:
presenting a virtual disk to a client computing device, the virtual disk including storage cells selected from direct attached storage (DAS) devices of a plurality of separate servers for access to data stored on the virtual disk, wherein the separate servers include internal storage controllers to control the DAS devices of the separate servers;
interconnecting the internal storage controllers of the separate servers together via a storage device interconnect to provide a pool of embedded controllers;
assigning the internal storage controllers in the pool of embedded controllers to be data handlers for controlling specific storage cells of the virtual disk;
selecting one of the internal storage controllers in the pool of embedded controllers to be a coordinator of the virtual disk to coordinate transactions between a client computing device and the data handlers of the virtual disk; and
in response to the selected internal storage controller becoming unavailable, establishing another internal storage controller in the pool of embedded controllers to be the coordinator to continue coordinating the transactions between the client computing device and the data handlers.

11. The method of claim 10, further comprising establishing alternate data paths to continue providing access to the data stored on the virtual disk when one of the DAS devices is unavailable.

12. The method of claim 10, further comprising: in response to a failure of one of the internal storage controllers, assigning another internal storage controller in the pool of controllers to be a data handler for the failed internal storage controller.

13. The method of claim 10, further comprising: in response to the virtual disk being moved from an old server to a new server, moving responsibility of the internal storage controller of the old server to an internal storage controller of the new server without having to copy data.

14. The method of claim 10, further comprising: transferring responsibility of controlling the specific storage cells of one of the internal storage controllers to another the internal storage controller for load balancing.

15. The method of claim 10, further comprising: moving responsibility for managing the DAS devices from one internal storage controller to another internal storage controller to re-establish redundancy in the event of a controller failure.

16. The method of claim 10, further comprising providing RAID 0, 1, 5, 6, 10, 50, and 60 data redundancy.

17. A server-embedded distributed storage system comprising:
a plurality of modular servers, wherein each server is constructed to be physically installed and removed from a chassis independently from the other server or servers, and each server includes a direct attached storage (DAS) device and an internal storage controller to manage the DAS device;
a virtual disk including a plurality of storage cells selected from the DAS devices of the modular servers; and a storage device interconnect to connect the internal storage controllers of the modular servers together into a pool of controllers, wherein the internal storage controllers in the pool of controllers are assigned as data handlers for controlling specific storage cells of the virtual disk, wherein a pair of the internal storage controllers in the pool of controllers is selected to be coordinators to coordinate transactions between a client computing device and the data handlers of the virtual disk, and wherein, in response to one of the coordinators becoming unavailable, another internal storage controller in the pool of controllers is selected to replace the unavailable coordinator to continue coordinating the transactions between the client computing device and the data handlers of the virtual disk.

18. The system of claim 17, wherein the modular servers comprise blade server modules or rack mount server modules.

* * * * *